United States Patent
Li et al.

(10) Patent No.: US 11,732,701 B2
(45) Date of Patent: *Aug. 22, 2023

(54) REFRIGERANT COMPRESSOR SEAL ARRANGEMENTS

(71) Applicant: Danfoss A/S, Nordborg (DK)

(72) Inventors: Tianlei Li, Tallahassee, FL (US); Lin Sun, Tallahassee, FL (US); Mihai Bogdan Dobrica, Albigny-sur-Saone (FR)

(73) Assignee: DANFOSS A/S, Nordborg (DK)

( * ) Notice: Subject to any disclaimer, the term of this patent is extended or adjusted under 35 U.S.C. 154(b) by 50 days.

This patent is subject to a terminal disclaimer.

(21) Appl. No.: 17/401,934

(22) Filed: Aug. 13, 2021

(65) Prior Publication Data

US 2021/0372382 A1    Dec. 2, 2021

Related U.S. Application Data

(63) Continuation of application No. 16/455,888, filed on Jun. 28, 2019, now Pat. No. 11,125,216.

(60) Provisional application No. 62/691,059, filed on Jun. 28, 2018.

(51) Int. Cl.
| | | |
|---|---|---|
| F04B 7/00 | (2006.01) | |
| F04B 43/00 | (2006.01) | |
| F16J 15/3288 | (2016.01) | |
| F25B 11/04 | (2006.01) | |

(52) U.S. Cl.
CPC .......... F04B 7/0088 (2013.01); F04B 43/009 (2013.01); F16J 15/3288 (2013.01); F25B 11/04 (2013.01); *F04B 2201/0803* (2013.01)

(58) Field of Classification Search
CPC ........ F04B 7/00; F04B 7/0084; F04B 7/0088; F04B 43/00; F04B 43/0009; F04B 43/0081; F04B 43/009; F04B 2201/00; F04B 2201/08; F04B 2201/0803; F25B 11/00; F25B 11/04
USPC ......................................... 277/355
See application file for complete search history.

(56) References Cited

U.S. PATENT DOCUMENTS

| | | |
|---|---|---|
| 5,181,728 A | 1/1993 | Stec |
| 5,318,309 A | 6/1994 | Tseng et al. |
| 6,010,132 A | 1/2000 | Bagepalli et al. |
| 6,612,581 B2 | 9/2003 | Bhate et al. |
| 2002/0000694 A1 | 1/2002 | Justak |
| 2002/0074729 A1 | 6/2002 | Aksit et al. |

(Continued)

FOREIGN PATENT DOCUMENTS

| | | | |
|---|---|---|---|
| DE | 102004041439 A1 | 3/2006 | |
| EP | 1 245 875 | * 10/2002 | ........... F16J 15/3288 |

(Continued)

OTHER PUBLICATIONS

Extended Eurpean Search Report for European Application No. 19183467.0 dated Nov. 5, 2019.

*Primary Examiner* — Nathan Cumar

(74) *Attorney, Agent, or Firm* — Carlson, Gaskey & Olds, P.C.

(57) ABSTRACT

A centrifugal compressor for HVAC application includes a rotary component rotatable about an axis, a static component, and a brush seal fixed to one of the static component and the rotary component. The brush seal includes bristles that contact the other of the static component and the rotary component.

16 Claims, 6 Drawing Sheets

(56) References Cited

U.S. PATENT DOCUMENTS

2003/0131602 A1\* 7/2003 Ingistov ................ F01D 11/001
                                                                             60/785
2013/0164119 A1\* 6/2013 Nakaniwa .............. F16J 15/443
                                                                            415/173.1

FOREIGN PATENT DOCUMENTS

| | | |
|---|---|---|
| GB | 2452040 A | 2/2009 |
| JP | 2013024057 A | 2/2013 |
| WO | 2012117016 A1 | 9/2012 |
| WO | 2018111457 A1 | 6/2018 |

\* cited by examiner

REFRIGERANT COMPRESSOR SEAL ARRANGEMENTS

CROSS-REFERENCE TO RELATED APPLICATIONS

This application is a continuation of U.S. application Ser. No. 16/455,888, filed Jun. 28, 2019, which claims priority to U.S. Provisional Application No. 62/691,059, filed Jun. 28, 2018.

BACKGROUND

Refrigerant compressors are used to circulate refrigerant in a chiller or heat pump via a refrigerant loop. Refrigerant loops are known to include a condenser, an expansion device, and an evaporator.

This disclosure relates to seal arrangements for reduction of leakage flow in turbomachinery compressors, and more particularly to brush seal arrangements.

SUMMARY

A centrifugal compressor for HVAC application according to an example of this disclosure includes a rotary component rotatable about an axis, a static component, and a brush seal fixed to one of the rotary component and the static component. The brush seal includes bristles that contact the other of the static component and rotary component.

In a further example of the foregoing, the brush seal is positioned to prevent leakage flow in an axial direction between the rotary component and the static component.

In a further example of any of the foregoing, the brush seal is positioned to prevent leakage flow in a radial direction between the rotary component and the static component.

In a further example of any of the foregoing, the compressor is a multi-stage centrifugal compressor.

In a further example of any of the foregoing, the bristles each have at least a portion that is angled relative to the radial direction.

In a further example of any of the foregoing, the brush seal includes a plurality of axially spaced bristle portions that contact the rotary component.

In a further example of any of the foregoing, one of the plurality of axially spaced bristle portions extends radially inward of a second of the plurality of axially spaced bristle portions.

In a further example of any of the foregoing, the rotary component includes a first surface axially spaced from a second surface. The first surface is radially inward of the second surface. The one of the plurality of axially spaced bristle portions contacts the first surface, and the second of the plurality of axially spaced bristle portions contacts the second surface.

In a further example of any of the foregoing, the bristles contact a surface of an annular groove in the rotary component.

In a further example of any of the foregoing, the rotary component includes a shaft.

In a further example of any of the foregoing, the compressor is a single stage compressor.

In a further example of any of the foregoing, the bristles each have at least a portion that is angled relative to the radial direction in a direction of rotation of the rotary component.

A refrigerant cooling system according to an example of this disclosure includes at least one centrifugal compressor, which includes a rotary component rotatable about an axis, a static component, and a brush seal fixed to one of the rotary component and the static component. The brush seal includes bristles that contact the other of the static component and the rotary component.

In a further example of the foregoing, the compressor is a multi-stage centrifugal compressor.

In a further example of any of the foregoing, the bristles each have at least a portion that is angled relative to the radial direction.

In a further example of any of the foregoing, the brush seal includes a plurality of axially spaced bristle portions that contact the rotary component.

A refrigerant heat pump system according to an example of this disclosure includes at least one centrifugal compressor, which includes a rotary component rotatable about an axis, a static component, and a brush seal fixed to one of the static component and the rotary component. The brush seal includes bristles that contact the other of the static component and the rotary component.

In a further example of the foregoing, the compressor is a multi-stage centrifugal compressor.

In a further example of any of the foregoing, the bristles each have at least a portion that is angled relative to the radial direction.

In a further example of any of the foregoing, the brush seal includes a plurality of axially spaced bristle portions that contact the rotary component.

These and other features may be best understood from the following specification and drawings, the following of which is a brief description.

DETAILED DESCRIPTION

Figure 1:
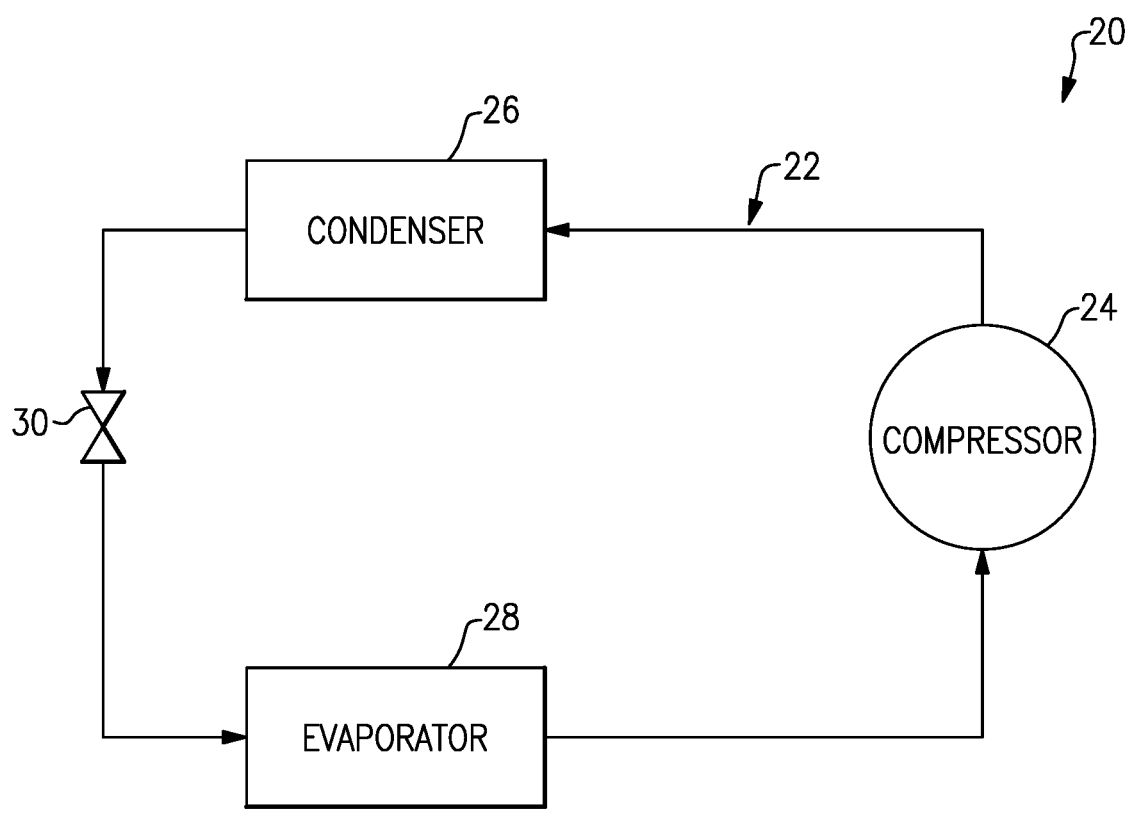
FIG. 1 is a schematic illustration of a refrigerant loop.

FIG. 1 schematically illustrates a refrigerant cooling or heat pump system 20. The refrigerant system 20 includes a main refrigerant loop, or circuit, 22 in communication with one or multiple compressors 24, a condenser 26, an evaporator 28, and an expansion device 30. This refrigerant system 20 may be used in a chiller or heat pump, as examples. Notably, while a particular example of the refrigerant system 20 is shown, this application extends to other refrigerant system configurations. For instance, the main refrigerant loop 22 can include an economizer downstream of the condenser 26 and upstream of the expansion device 30.

Figure 2:
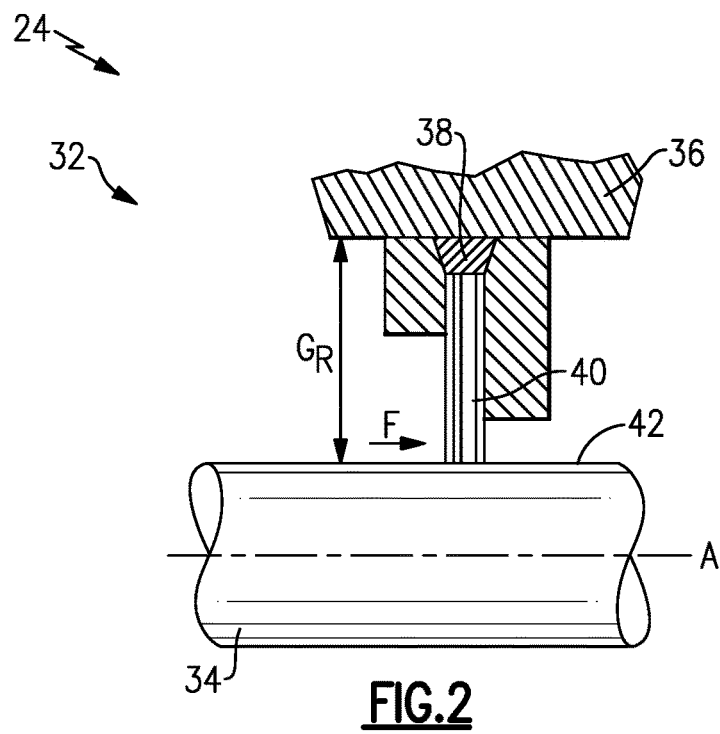
FIG. 2 illustrates a portion of an example compressor having an example brush seal arrangement.

FIG. 2 illustrates a portion 32 of an example compressor 24 including a rotary component 34 rotatable about an axis A and a static component 36. A brush seal 38 is fixed to the static component 36 and includes a number of bristles 40 that contact a surface 42 of the rotary component 34. The brush seal 38 therefore seals a gap $G_R$ between the rotary component 34 and the static component 36. As shown in the example, the gap $G_R$ extends radially and circumferentially with respect to axis A, and the brush seal 38 also extends radially and circumferentially to seal the gap $G_R$ against an axial flow F. The brush seal 38 may be fully annular in some embodiments. The flow F could flow in either direction relative to the bristles 40.

In some embodiments, the compressor 24 is a single stage centrifugal compressor having a high pressure chamber and a low pressure chamber, and the brush seal 38 minimizes leakage losses between the high pressure chamber and the low pressure chamber by sealing one or more gaps between rotary and stationary components. In some embodiments, the compressor is a multi-stages centrifugal compressor, and the brush seal 38 minimizes leakage losses between each adjacent stages by sealing one or more gaps between rotary and stationary components. Although the brush seal 38 is fixed to the static component 36 in the example compressor 24, and the bristles 40 contact the rotary component 34, in alternative embodiments, the brush seal may be fixed to the rotary component and the bristles contact the static component.

Figure 3:
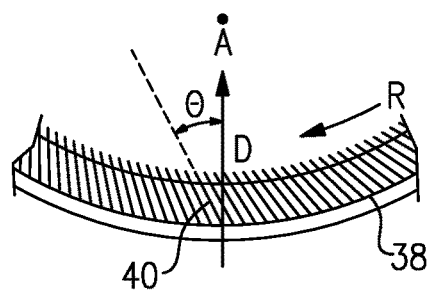
FIG. 3 illustrates a section of an axial view of the example brush seal arrangement shown in FIG. 2.

FIG. 3 illustrates an axial view of a portion of the example brush seal 38 shown in FIG. 2. As shown, each bristle 40 is angled an angle θ from a radial direction D with respect to the axis A. The bristles 40 are angled from the radial direction D in the direction R, which is representative of the rotational direction of the rotary component 34 (see FIG. 2). Angling the bristles 40 in the direction of rotation R of the rotary component 34 reduces the resistance of the rotation of the rotary component 34 from the brush seal 38. Although the entire bristle 40 is shown as angled in the FIG. 3 embodiment, in other embodiments, a radially inner portion of each bristle may be angled. In other embodiments, the bristles 40 may not be angled.

Figure 4:
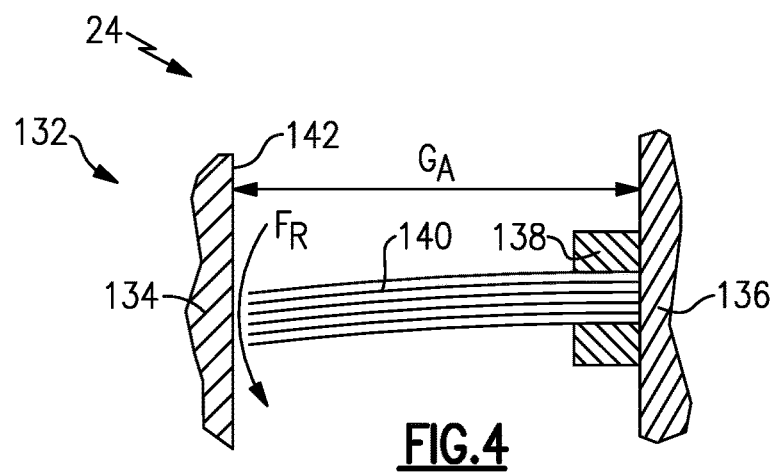
FIG. 4 illustrates another example brush seal arrangement.

FIG. 4 illustrates a portion 132 of the compressor 24 having a brush seal 138 that seals an axial gap $G_A$ between a rotary component 134 and a stationary component 136. The brush seal 138 seals against a radial leakage flow FR through the gap $G_A$. The bristles 140 contact a surface 142 of the rotary component 134. In some embodiments, the rotary component 134 is an impeller and the brush seal 138 seals a gap $G_A$ between the impeller and a static component 136. It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

Figure 5:
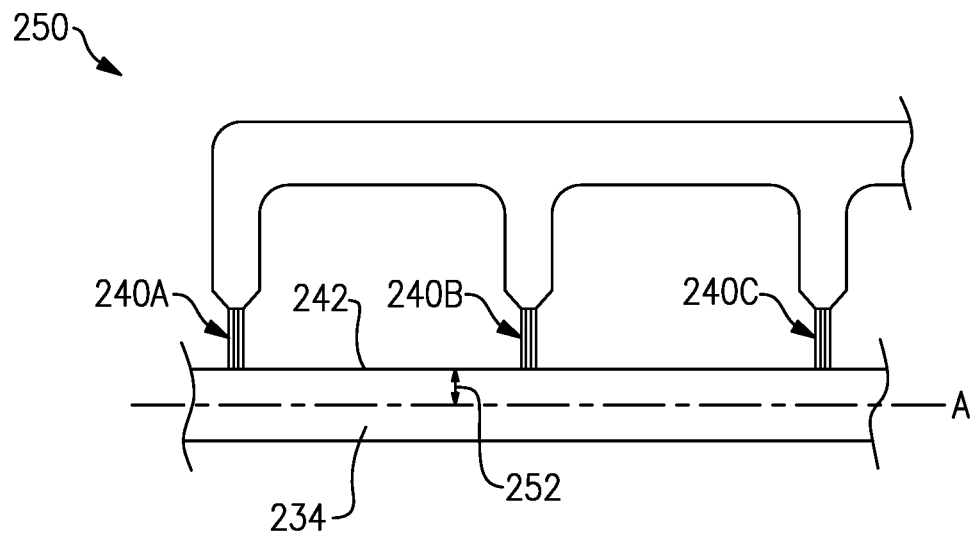
FIG. 5 illustrates another example brush seal arrangement.

FIG. 5 illustrates an example brush seal configuration 250 including three axially spaced bristle portions 240A/240B/240C contacting a surface 242 of a rotary component 234. As shown, the rotary component 234 has a constant radius at least from the bristle portion 240A to the bristle portion 240C. The bristle portions 240A/240B/240C are substantially radially aligned with respect to the axis A.

Figure 6:
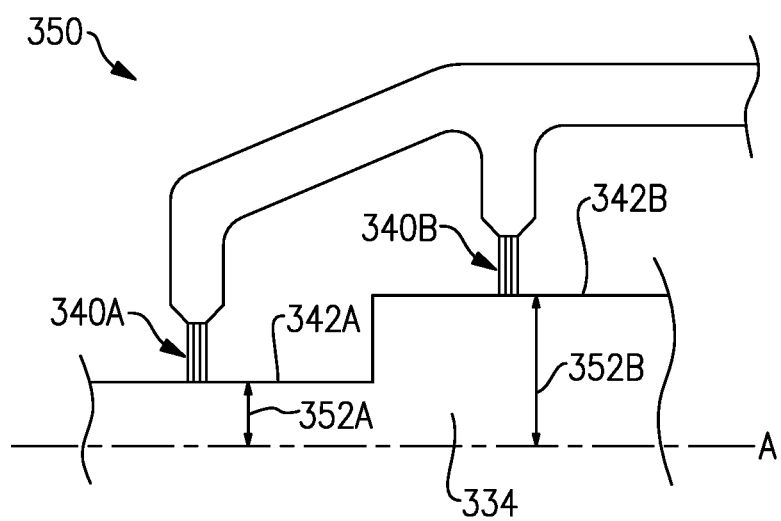
FIG. 6 illustrates another example brush seal arrangement.

FIG. 6 illustrates an example brush seal configuration 350 including a bristle portion 340A axially spaced from a bristle portion 340B. The bristle portion 340A contacts a surface 342A of the rotary component 334, and the bristle portion 340B contacts a surface 342B of the rotary component 334. The surface 342A has a radius 352A and the surface 342B has a radius 352B. The radius 352B is greater than the radius 352A, such that the surface 342B is radially outward of the surface 342A. The bristle portion 340A extends radially inward of the bristle portion 340B.

Figure 7:
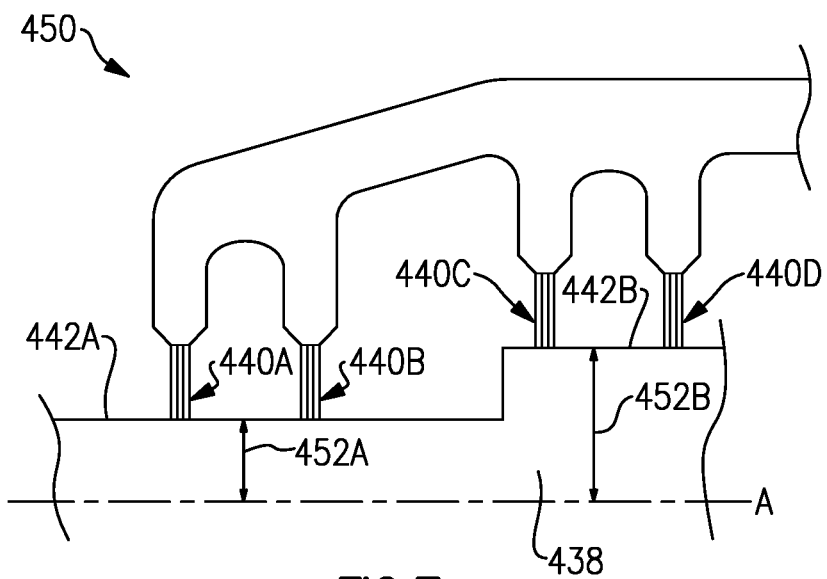
FIG. 7 illustrates another example brush seal arrangement.

FIG. 7 illustrates an example brush seal configuration 450 including four axially spaced bristle portions 440A/440B/440C/440D. The portions 440A and 440B are radially aligned and contact the surface 442A of the rotary component 438, and the portions 440C and 440D are radially aligned and contact the surface 442B of the rotary component 438. The surface 442A has a radius 452A and the surface 442B has a radius 452B. The radius 452B is greater than the radius 452A such that the surface 442B is radially outward of the surface 442A. The bristle portions 440A and 440B extend radially inward of the bristle portions 440C and 440D.

Figure 8:
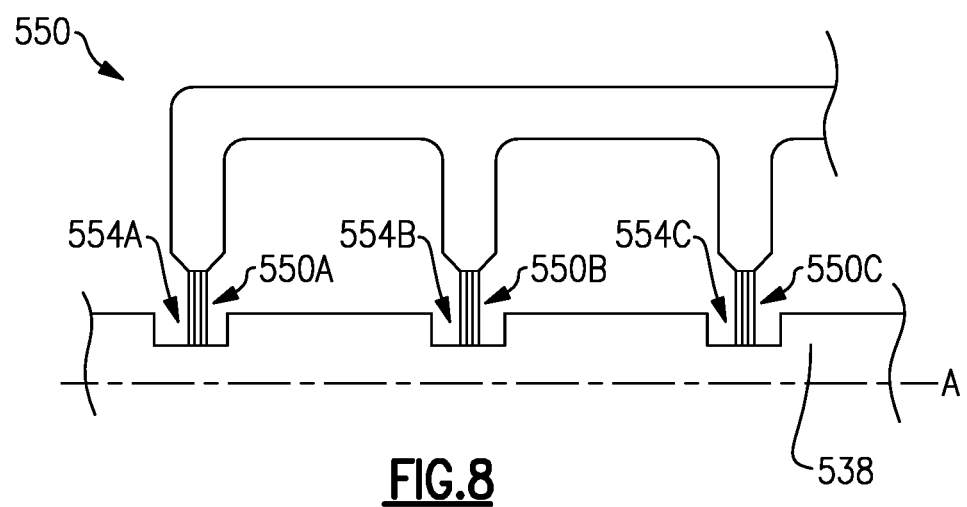
FIG. 8 illustrates another example brush seal arrangement.

FIG. 8 illustrates an example brush seal configuration 550 including three axially spaced bristle portions 540A/540B/540C. The rotary component 538 includes three axially spaced annular grooves 554A/554B/554C. The bristle portion 540A is axially aligned with the groove 554A, the bristle portion 540B is axially aligned with the groove 554B, and the bristle portion 540B is axially aligned with the groove 554B. In the example shown, the bristle portions 540A/540B/540C contact the surface of the rotary component 538 within the grooves 554A/554B/554C, but the bristle portions 540A/540B/540C may not contact the surface in other embodiments.

Figure 9:
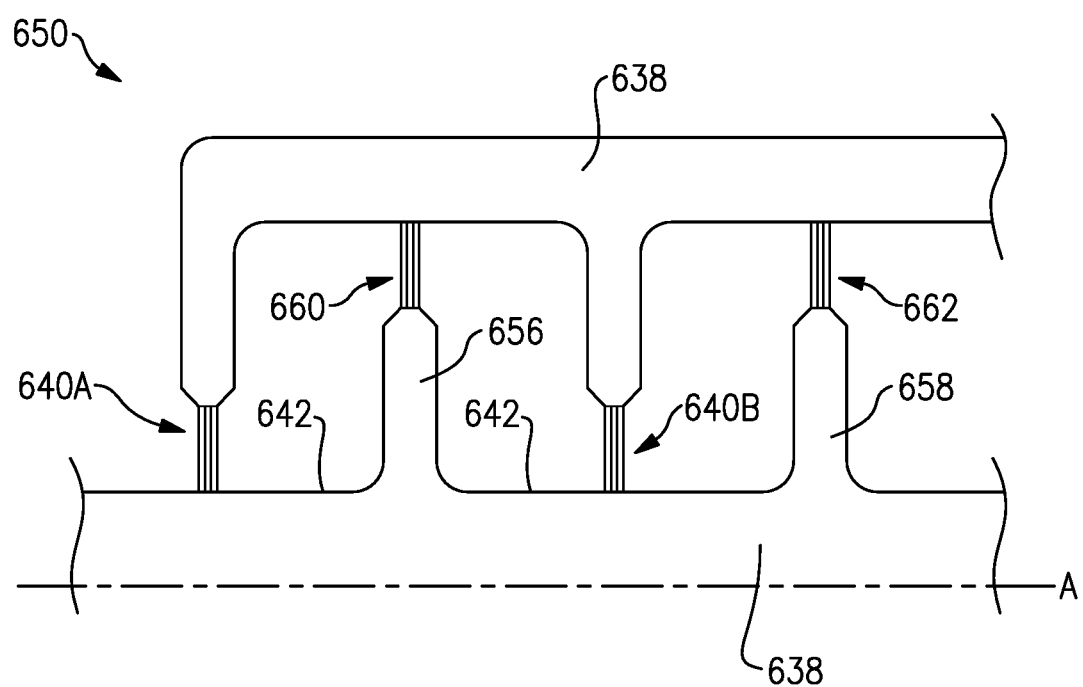
FIG. 9 illustrates another example brush seal arrangement.

FIG. 9 illustrates an example brush seal configuration 650. A brush seal 638 has two axially spaced bristle portions 640A and 640B that contact the surface 642 of the rotary component 638. Two brush seals 656, 658 extend radially outward from the surface 642, such that bristle portions 660, 662 contact the brush seal 638 having bristle portions 640A and 640B. The bristle portion 660 is axially between the bristle portions 640A and 640B. The bristle portion 640B is axially between the bristle portions 660 and 662.

Figure 10:
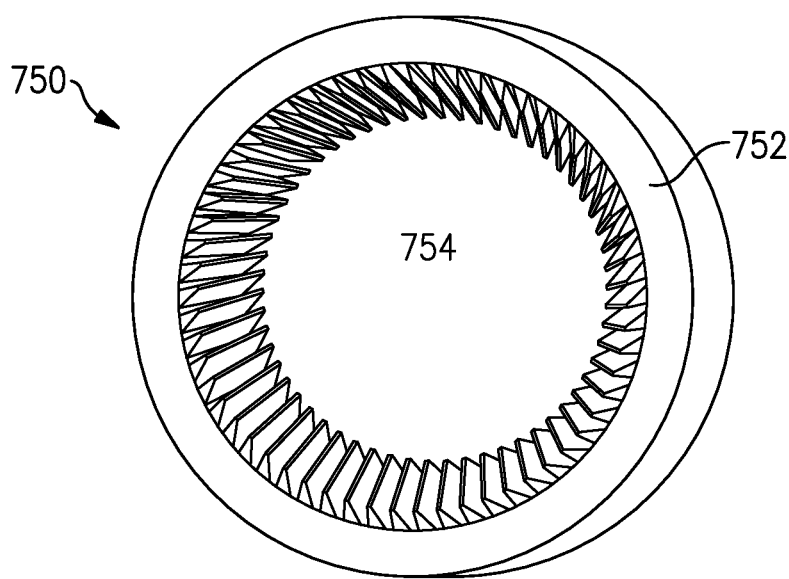
FIG. 10 illustrates another example brush seal arrangement.

FIG. 10 illustrates an example brush seal configuration 750, including a base 752 and a number of carbon nanotube bristles 754 extending from the base 752. In some examples, the base 752 may be one or more of a variety of metals such as stainless steel, carbon steel, copper, and/or titanium. In some examples, the carbon nanotube bristles 754 are made by the chemical vapor deposition process. In some examples, the carbon nanotube bristles 754 bond to the metal base 752.

The free ends of the carbon nanotube bristles 754 contact a rotary component (not shown) during operation to form a brush seal and minimize leakages in some examples. In the example shown, the carbon nanotube bristles 754 extend radially inward from an inner diameter of the base 752, but other configurations may be utilized, including carbon nanotube bristles 754 extending radially outward from a structure.

Figure 11:
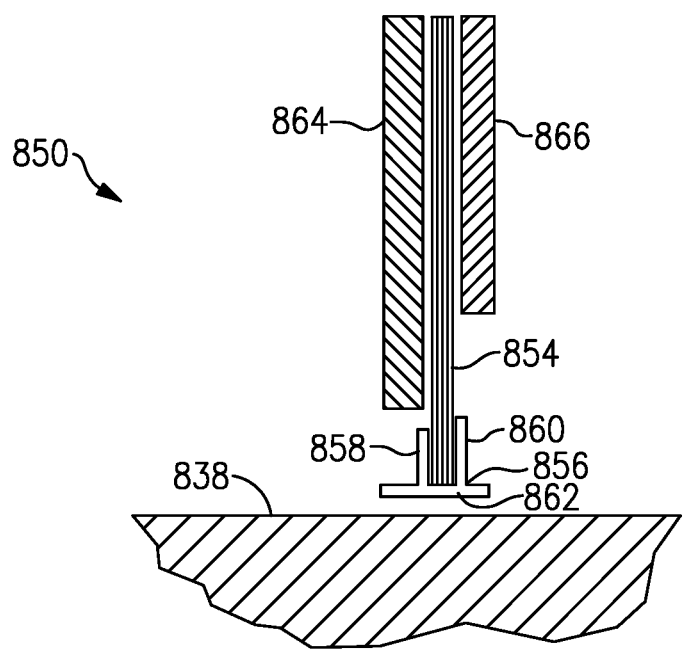
FIG. 11 illustrates another example brush seal arrangement.

FIG. 11 illustrates another example bush seal configuration 850. The example carbon nanotube bristles 854 include a pad 856 attached to their ends and between the carbon nanotube bristles 854 and the rotary component 838. In the example, during normal operation of the compressor, air film will build up between the pad 856 and the rotary component 838 which removes the contact between the seal 850 and the rotary component 838. The flexible nature of the carbon nanotube bristles 854 will deflect and restore the position of the aerodynamic pad 856. In some examples, the pad 856 may be one or more of a variety of metals such as stainless steel, carbon steel, copper, and/or titanium. In some examples, the radially inner surface of the pad 856 can be smooth, coated, or further CVD coated with carbon nanotubes.

The example pad 856 may include a front portion 858, a back portion 860 axially spaced from the front portion, and an inner portion 862 radially inward of the front portion 858 and back portion 860. The portions 858, 860, and 862 may generally form a U-shape in some examples, as shown. The bristles 854 may be located axially between a front plate 864 and a back plate 866.

In other examples, the carbon nanotubes 854 may be replaced with beam like structures, lattice structures, or maze structures.

Bristle densities and diameters of the embodiments described may be engineered to minimize leakage flow cross-sectional area and frictional resistance to the shaft rotation. The bristles' capability of bending allows the bristles to contact the rotating component at all times in some embodiments, which accommodates shaft excursions. When refrigerant leakage flow tries to flow through a brush seal, the refrigerant will experience resistance from the bristles, reducing leakage flow rate.

By adjusting the radial positions of both radial and axial brush seals relative to the rotation axis A, one can balance the axial thrust force on the rotating element which minimize the force residing on the axial bearing.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A refrigerant cooling system comprising:
   at least one multi-stage centrifugal compressor having a first stage and a second stage and including
   a rotary component rotatable about an axis;
   a static component;
   a brush seal positioned within a gap between the first stage and the second stage and fixed to one of the static component and the rotary component and including bristles, wherein the bristles contact the other of the static component and the rotary component, and the bristles each have at least a portion that is angled relative to the radial direction.

2. The system as recited in claim 1, wherein the brush seal includes a plurality of axially spaced bristle portions that contact the rotary component.

3. A refrigerant heat pump system comprising:
   at least one multi-stage centrifugal compressor having a first stage and a second stage and including
   a rotary component rotatable about an axis;
   a static component;
   a brush seal positioned within a gap between the first stage and the second stage and fixed to one of the static component and the rotary component and including bristles, wherein the bristles contact the other of the static component and the rotary component, and the bristles each have at least a portion that is angled relative to the radial direction.

4. The system as recited in claim 3, wherein the brush seal includes a plurality of axially spaced bristle portions that contact the rotary component.

5. A centrifugal compressor for HVAC application, comprising:
   a rotary component rotatable about an axis;
   a static component;
   a brush seal fixed to the static component, and including a first set of bristles, wherein the first set of bristles contact the rotary component;
   a second brush seal fixed to the rotary component and including a second set of bristles, wherein the second set of bristles contact the static component.

6. The compressor as recited in claim 5, wherein each of the first and second brush seals is positioned to prevent leakage flow in an axial direction between the rotary component and the static component.

7. The compressor as recited in claim 5, wherein the compressor is a multi-stage centrifugal compressor.

8. The compressor as recited in claim 5, wherein the first set of bristles each have at least a portion that is angled relative to the radial direction.

9. The compressor as recited in claim 8, wherein the second set of bristles each have at least a portion that is angled relative to the radial direction.

10. The compressor as recited in claim 5, wherein the second set of bristles each have at least a portion that is angled relative to the radial direction.

11. The compressor as recited in claim 5, wherein the first set of bristles contact a surface of an annular groove in the rotary component.

12. The compressor as recited in claim 5, wherein the rotary component includes a shaft.

13. The compressor as recited in claim 5, wherein the compressor is a single stage compressor.

14. The compressor as recited in claim 5, further comprising:
    a third brush seal fixed to the static component, and including a third set of bristles, wherein the first set of bristles contact the rotary component;
    a fourth brush seal fixed to the rotary component and including a fourth set of bristles, wherein the second set of bristles contact the static component.

15. The compressor as recited in claim 14, wherein the third brush seal is disposed axially between the second and fourth brush seals.

16. The compressor as recited in claim 15, wherein the second brush seal is disposed axially between the first and third brush seals.

* * * * *